United States Patent [19]
Rahn

[11] Patent Number: 5,367,377
[45] Date of Patent: Nov. 22, 1994

[54] SOLID STATE SPLIT-GAIN MULTIOSCILLATOR RING LASER GYROSCOPE

[75] Inventor: John P. Rahn, West Hills, Calif.

[73] Assignee: Litton Systems, Inc., Beverly Hills, Calif.

[21] Appl. No.: 195,984

[22] Filed: Feb. 14, 1994

Related U.S. Application Data

[63] Continuation-in-part of Ser. No. 744,784, Jul. 19, 1991, abandoned, which is a continuation-in-part of Ser. No. 517,647, Apr. 20, 1990, abandoned.

[51] Int. Cl.⁵ .................. G01B 9/02; H01S 3/083
[52] U.S. Cl. ........................... 356/350; 372/94
[58] Field of Search ................ 356/350; 372/94

Primary Examiner—Stephen C. Buczinski
Attorney, Agent, or Firm—L. D. Rish; J. F. Kirk; C. E. Martine

[57] ABSTRACT

Disclosed herein is a Solid State Split-Gain Multioscillator Ring Laser Gyroscope comprising, in a preferred embodiment, a solid state Nd:YAG crystal body defining a non-planar resonator path. Magnetic sources are provided which effectuate the Split-Gain Selective Mode Suppression Phenomena. Total internal reflection along facets of the crystal or glass allow reduced cost during manufacture of the Gyroscope. An alternative embodiment includes a solid state active medium on a chip, allowing the resonator path to be primarily lying in a glass monolithic compact solid state frame.

19 Claims, 5 Drawing Sheets

SOLID STATE SPLIT-GAIN MULTIOSCILLATOR RING LASER GYROSCOPE

This is a continuation-in-part of co-pending application Ser. No. 07/744,784 filed Jul. 19, 1991 which was a continuation-in-part of Ser. No. 07/517,647 filed Apr. 20, 1990, both abandoned.

BACKGROUND OF THE INVENTION

1. Field of the Invention

The present invention relates to ring laser gyroscope including multioscillator ring laser gyroscopes, and more particularly, to a solid state multioscillator ring laser gyroscope exhibiting the split gain effect.

2. Description of Related Art

Over the past twenty years, the gaseous medium planar ring laser gyroscope has been developed and evolved as a reliable and relatively environmentally insensitive inertial rotation sensor. Planar ring laser gyroscopes, of both triangular and square geometries, have been used in inertial navigation systems and flight control systems regularly in both commercial and military aircraft. A primary advantage of the ring laser gyroscope over the spinning wheel mechanical gyroscope is its ability to withstand relatively large mechanical shock without permanent degradation of its performance. Because of this and other features the expected mean time between failures of most RLG inertial navigation systems are somewhat longer than the mechanical gyroscopes they replace. The planar ring laser gyroscope was a first attempt at a non-mechanical truly strap-down inertial navigation system.

At low rotation rates, the retroscatter from the mirrors couples energy from one of the oscillating beams into the oppositely propagating beam which locks the oscillating frequencies together yielding zero rotation information at low rotation rates. Current operational ring laser gyroscopes having a planar configuration use mechanical dithering schemes to bias the rate sensor to avoid this well known lock-in phenomenon. Mechanical dither is very effective in reducing the effects of lock-in and makes the ring laser gyroscope a viable navigational gyroscope. However, an effective mechanically dithered ring laser gyroscope adds a noise component to the output of the ring laser which in turn reduces its ultimate accuracy. Also, the presence of mechanical dither, either in the mirror or dither of the entire gyroscope body, detracts from the desired goal of a fully strapped down inertial navigational unit.

With these problems in mind, an alternative biasing techniques have been developed using the nonreciprocal Faraday effect in either an application of a magnetic field directly to the gain medium known as the Zeeman effect, or a solid glass element known as a Faraday glass, which when used in combination with the magnetic field, provides a Faraday effect phase shift for one beam that is opposite the phase shift of the oppositely directed beam whereby two counter rotating beams are split infrequency. To achieve actual phase shifts instead of simple polarization rotation, two pairs of oppositely directed circularly polarized beams are optimally present within a single optical path to achieve a desired result. An example of this theory of multioscillator ring laser gyroscope may be found in U.S. Pat. No. 4,818,087 entitled "ORTHOHEDRAL RING LASER GYRO" issued Apr. 4, 1989 to Raytheon Corporation (Terry A. Dorschner, inventor). The nonplanar ray path produced in a multioscillator ring laser gyroscope insures circularly polarized light with reciprocally split frequencies. The nonplanar ray path reciprocally rotates the polarizations by many degrees yielding the necessary high purity circular polarization. The nonplanar reciprocal phase shift also achieves two Faraday bias gyroscopes, the gain curve 10 of which is illustrated in FIG. 1. The nonplanar ray path splits the light through its geometry into two separate gyroscopes, one being left circularly polarized and the other right circularly polarized. This splitting is known as reciprocal splitting and typically is in the range of 100 MHz. By placing a Faraday element in the beam path of a nonplanar ring laser gyroscope, when the proper magnetic field is applied to the Faraday glass element, nonreciprocal splitting of each gyroscope is achieved. At least four modes are produced: a left circularly polarized anti-clockwise frequency ($L_a$), a left circularly polarized clockwise beam ($L_c$), a right circularly polarized clockwise beam ($R_c$), and a right circularly polarized anti-clockwise beam ($R_a$). The Faraday splitting between clockwise and anti-clockwise modes is about 1 MHz. At least four mirrors form the ring resonator path, which contains the two gyroscopes symbolized by their respective gain curves of FIG. 1. One of the mirrors is semitransparent to allow light to leave the resonator and fall upon a photo detector for signal processing. When the signals are subtracted during the electronic processing to remove the Faraday bias, the scale factor of the gyroscope is doubled over the conventional ring laser gyroscope. The nonplanar geometry multioscillator ring laser gyroscope using a Faraday element is currently manufactured using a gas discharge to provide the active medium, which medium occupies a portion of the light beam path.

FIG. 2 shows an alternative form of ring laser gyroscope, through the diagram of its gain curve 20 A and B, which is known as the split gain gyroscope. The operation of this gyroscope is more fully described the patent application entitled "Split Gain Multimode Ring Laser Gyroscope and Method" Ser. No. 07/115,018, Filed Oct. 28, 1987 (Graham Martin, inventor), and assigned to the same assignee of this application. Ser. No. 07/115,018 is currently under United States Patent Office Secrecy Order (Type One Order). A brief explanation of the split gain gyroscope may be understood by reference to the gain curve 20 A and B of FIG. 2. Rather than operate in a single longitudinal mode as the multioscillator ring laser gyroscope of FIG. 1, the split gain gyroscope curve 20 A and B of FIG. 2 results from a nonplanar optical path to achieve reciprocal splitting setting up two separate gyros. However, the four different frequencies of the split gain gyroscope operate along more than a single longitudinal mode. The proper application of a uniform magnetic field in a gain regional of a split gain gyroscope allows one to achieve the equivalent of a Faraday bias by suppressing two of the four modes in each set of the longitudinal frequencies. These axial magnetic fields depend on the free spectral range of the cavity and typically have an average value of about 400 gauss. The axial fields are not used to create a Faraday bias as in the Faraday multioscillator gyroscope, but instead are used to effectively suppress the lasing action of two of the four gyro modes in each longitudinal mode set. For example, a first set of longitudinal frequencies, below Curve 20A, (as shown in FIG. 2), namely, the left circularly polarized clockwise ($L_c$) and the right circularly polarized anti-clockwise ($R_a$) components of a first longitudinal set (q mode) and reciprocally split by a frequency difference 21, are suppressed in that the threshold 22 of the gain curve 20A is above the lasing frequencies of these two modes. "q" is an integer denoting a longitudinal mode number which is an integer N.) As a result, for the q mode, only the left anti-clockwise circular mode ($L_a$) and the right clockwise circular polarized frequency ($R_c$) remain, lasing under Curve 20A. The opposite effect may be had in the q+1 mode (Curve 20B), so that the left circular polarized clockwise mode ($L_c$) and the right circular polarized anti-clockwise mode ($R_a$) remain, and are split non-reciprocally by a frequency difference 23. By operating over a frequency range of eight potential circular polarized frequencies ($L_a$, $R_c$, $L_c$, and $R_a$), and then suppressing four of these frequencies ($L_c$, $R_a$, $L_a$, and $R_c$), the effect of reciprocal splitting (through use of a nonplanar path) and the nonreciprocal splitting (through use of mode suppression rather than the Faraday effect) achieves an operational multi-oscillator ring laser gyroscope without the need for a Faraday element other than the gas medium. Additionally, the split gain gyroscope operates so that the two respective gyroscopes (Splittings 21 and 23) are separated by a Free Spectral Range of 1000 MHz or more, while each of the sets of lasing longitudinal modes ($L_a$, $R_c$ and $L_c$, $R_a$) are reciprocally split by approximately 100MHz or more, rather than 1 MHz as in Faraday biased Multioscillator ring laser gyroscopes. Furthermore, the split gain multioscillator ring laser gyroscope is not only a monolithic device but also has such a large bias that backscatter effects become secondary.

All the above ring laser gyroscopes are strapped down alternatives to the dithered planar ring laser gyroscope or the mechanical gyroscope. Both the multioscillator and the split gain gyroscope currently use a gaseous active medium. Gas discharge pumping requires expensive vacuum processing. This gas processing expense is not greatly reduced as the gas laser size is reduced. Additionally, active medium gaseous ring lasers are subject to life time degradation due to sputtering at the cathode of a DC excited active ring laser gyroscope.

Recent work in the ring laser solid state field and particularly optically pumped Nd:YAG lasers appear to be promising as a potential substitute for gaseous laser sources. U.S. Pat. No. 4,578,793, entitled "*SOLID-STATE NON-PLANAR INTERNALLY REFLECTING RING LASER*", issued Mar. 25, 1986 to Stanford University (Kane and Byer, inventors) disclosed a solid state nonplanar internally reflecting ring laser, the operation of which was further described in an article in Lasers and Optronics entitled *Diode-Pumping The Nd:YAG Laser*, LASERS & OPTRONICS, (Jun., 1987) 57–59. This article indicated that one might consider a Neodymium-Yttrium aluminum garnet material (Nd-YAG) may be used to provide a totally internally reflected ring laser source. Rather than using a gas discharge to excite the active medium, the solid state Nd-YAG laser proposed in this article would use an optically pumped source, typically in the form of a laser diode. According to the article the potential for an efficient pumping process may be achieved using a laser diode with a wave length between 795 and 805 nanometers to pump the Nd-YAG glass. When such a material is end pumped, it is easy to achieve a $TEM_{oo}$ transverse operational mode, which is needed for proper operational ring laser gyroscope or ring laser source. A solid state nonplanar internally reflecting ring laser, substantially as described in the '793 patent has recently been made available for commercial use by Light Wave Electronics Corporation of Mountain View of California. The teachings of the '793 patent operate in such a manner that the entire prism shown in FIG. 3 has a number of reflecting surfaces to provide an out of plane path. The entire prism is placed in the magnetic field creating a higher lost in one direction than the other, thereby forming an oscillator which includes an optical diode. The inventor claims to achieve frequency stability allowing coherent detection of laser radiation with a low band width detector for communication purposes. (Also, consider the articles by Bingkun Zhou, Thomas J. Kane, George J. Dixon, and Robert L. Byer entitled "*Efficient, frequency-stable laser-diode-pumped Nd:YAG laser*" (OPTICS LETTERS), Vol. 10, No.2, pp. 62–64 (February, 1985) and Thomas J. Kane and Robert L. Byer entitled "*Monolithic, unidirectional single mode Nd:YAG ring laser*" (OPTICS LETTERS), Vol. 10, No.2, pp. 65–67 (February, 1985). Both articles are directed to solid-state optically pumped lasers.)

In U.S. Pat. No. 4,747,111 issued to Hewlett Packard Company May 24, 1988, entitled "*QUASI-PLANAR MONOLITHIC UNIDIRECTIONAL RING LASER*" (Trutna, Inventor), the monolithic unidirectional single mode Nd-YAG ring laser was a basis for the disclosure of the '111 patent. The unidirectional ring laser of the '111 patent provides a stable single mode 1.3 micrometer output when placed in a magnetic field of 100 Gauss. The design embodied in this patent is directed to a monolithic semiconductor laser suitable for optical fiber communications.

In U.S. Pat. No. 4,829,537, entitled "*SOLID STATE LASERS WITH SPHERICAL RESONATORS*" issued May 9, 1989 to SpectraPhysics Inc. (BAER, inventor), a spherical resonator is disclosed which produces laser radiation having spherical modes of oscillation entirely within this sphere of the laser gain. A toroid region within this sphere forms a resonator. The design is envisioned for use in conjunction with the prism for input and output to the couplings of fiber optics. Alternatively it is suggested that the toroidal resonator forms a ring laser that may be used as a gyroscope.

The resonator described in this patent is accomplished with an optically pumped source. In this manner, the prior art has suggested the use a solid state resonator for ring laser gyroscope application.

SUMMARY OF THE INVENTION

In view of the foregoing, a multioscillator ring laser gyroscope having a solid state active medium ring resonator, which includes a non-planar resonate pathway is proposed. In particular a laser source for driving the active medium above the threshold for oscillation, such as a laser diode may be associated with the ring resonator. The active medium along a portion of the optical path of the ring resonator would be subject to a magnetic field which achieves a uniform split gain effect extinguishing selected modes of laser operation to achieve the advantages of the split gain multioscillator ring laser gyroscope with a solid state active medium. The laser source used to drive the active medium may be a continuous wave semi-conductor laser diode operating at a preset narrow band frequency to match the absorption characteristics of the ring resonator active media. The active medium, in one embodiment, may comprise the entire solid-state crystal, being a Nd:YAG material or an alternative optically active material. An alternative embodiment includes a solid state active medium which occupies a small portion of the resonator pathway, thus allowing a more controllable split gain effect, where the magnetic source may be positioned to provide a relatively high field over a substantially localized area.

DETAILED DESCRIPTION OF THE PREFERRED EMBODIMENT

Figure 1:
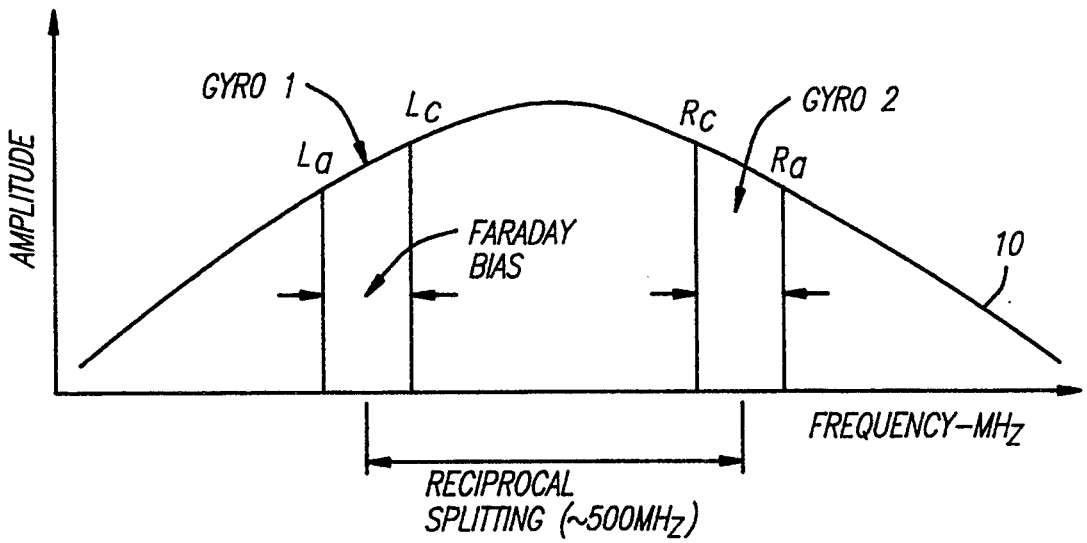
FIG. 1 is a PRIOR ART graphic representation of the Gain Profile curve for a non-planar multioscillator ring laser gyroscope, showing both reciprocal and Faraday splitting of the multimode resonant frequencies of the ring laser gyroscope.

With reference to FIG. 3, there is shown generally a preferred embodiment of the Solid State Split-Gain Ring Laser Gyroscope 30. The gyroscope is comprised of a monolithic frame 32, which in this embodiment is preferably made from a Neodymium-Yttrium Aluminum Garnet (Nd:YAG) s crystalline material distinguished, in part, by the presence of a plurality of uncoated total internal reflecting (TIR) surfaces 34, 36, almost TIR surface 38, and coated surface 39 (defining a non-planar resonant pathway (42, 44, 46, and 48). A laser source 50, such as a continuous wave semi-conductor laser diode (such as a Gallium Aluminum Arsenide [GaAlAs] laser) operating at the preset 0.82 micron wavelength, powered from a power source, such as a current source, not shown, is well matched for driving the active medium frame 32 above threshold for oscillation, the laser source 50 optically pumping the ring resonator gyroscope 30. The source is set at a wavelength that matches the resonant modes of the frame 32 and its particular dimensions. Alternatively, a cylindrical lens (not shown) may be used in a conventional manner to focus the output beam from the laser source from the side wall 37 of the frame 32 onto the resonator pathway. This method of pumping is known as side pumping, and has intrinsic mode qualities lower than end pumping. An output prism 40 represents a means for combining the clockwise and anti-clockwise longitudinal modes to provide a combined output beam containing a heterodyned output signal having a beat signal representative of the inertial rotation rate of the gyroscope. Phantom block 41, is powered from a power source, not shown, and is coupled to output prism 40 and represents a detector and amplifier for detecting and amplifying the beat signal in heterodyned output signal and for providing an output signal. The combination of the output prism 40 and phantom block 41 represent an output means for combining the clockwise and anti-clockwise longitudinal modes and for providing an output signal. The surface 38 is a nearly totally internally reflecting surface (formed by simple coating techniques) and allows a portion of the light to exit the crystal frame 32 and enter the detector prism 40. The two surfaces 36 and 34 are TIR surfaces (Totally Internally Reflecting Surfaces). These surfaces may be uncoated, unlike the highly polished and coated corner mirrors of a gaseous medium multioscillator ring laser gyroscope. The entire ring resonator pathlength may be on the order of 4 cm, with an approximate volume of one cubic inch. Surface 39 is coated so as to transmit the pump wave length but reflect the ring laser wavelength.

Figure 3A:
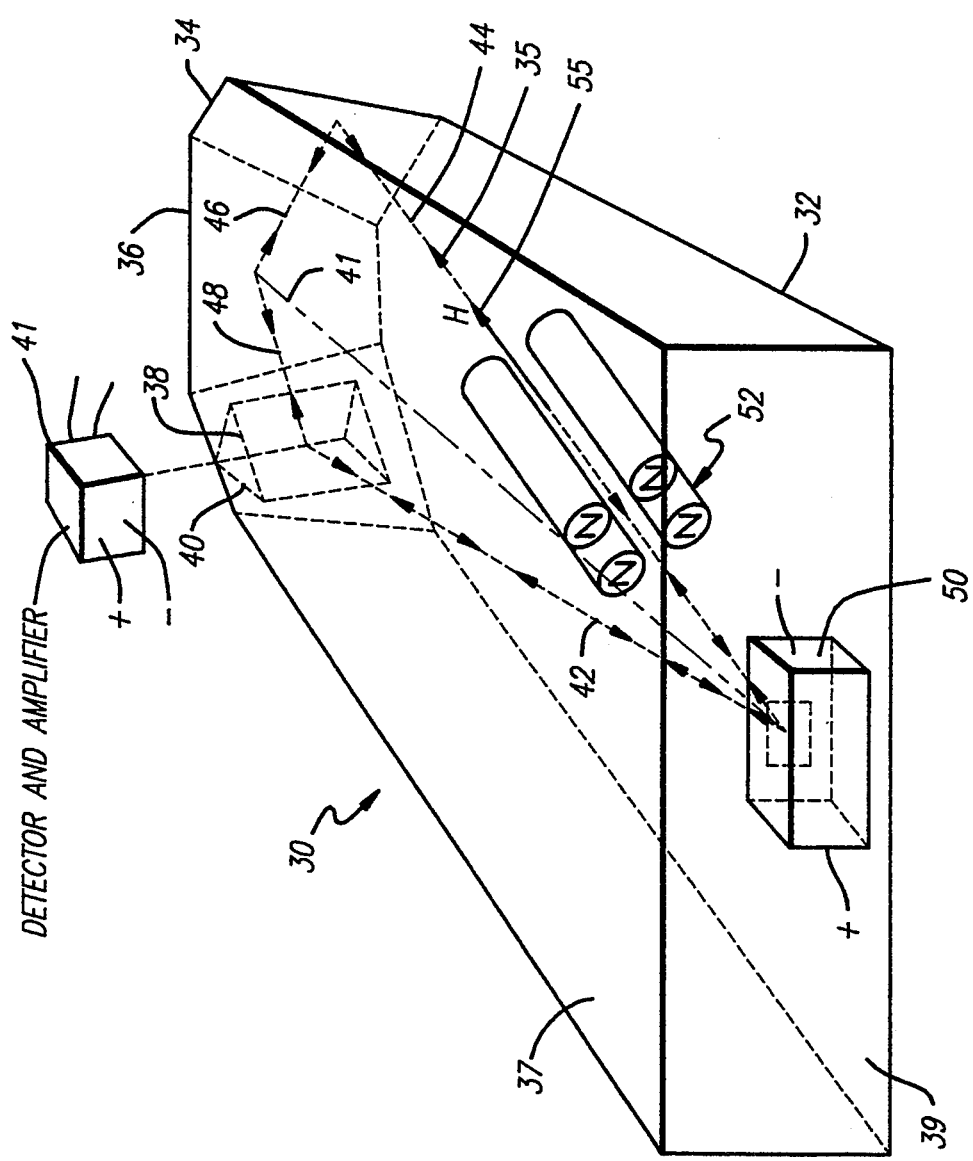
FIG. 3A is a perspective view of a preferred embodiment of the Solid State Multioscillator Ring Laser Gyroscope which is the subject of this application.
Figure 3B:
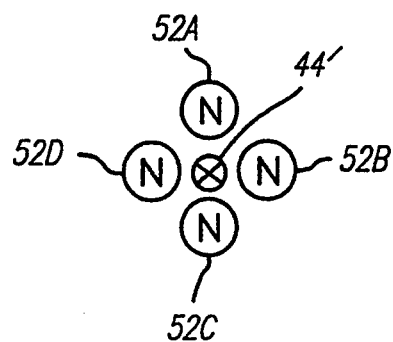
FIG. 3B is an end planar view of the configuration of magnets 52A through 52D shown in FIG. 3A.
Figure 3C:
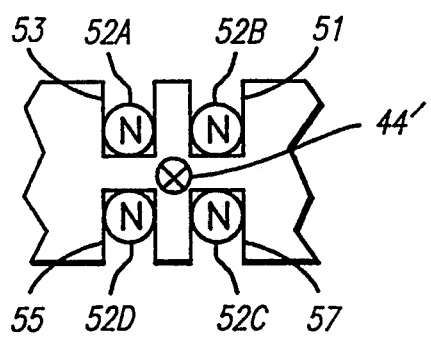
FIG. 3C is an alternative end planar view of the configuration of magnets 52A through 52D shown in FIG. 3A.

With reference to FIGS. 3A, 3B and 3 C, permanent magnet sources, such as the cylindrical magnets shown at 52A through 52D, may be manufactured from Samarium Cobalt, for producing a higher magnetic field, in the range of 1 Tesla magnetic field strength. Alternatively, the magnetic sources may be manufactured from a high temperature superconductor material such as Yttrium Barium Copper Oxide for producing a high magnetic field, in the range of 1-10 Tesla magnetic field strength. These magnets 52A through 52D are standard dipoles having north and south poles at either longitudinal end of the magnets. In the FIGS. 3A through 3C, a view is taken looking at the North Poles. These magnets are used to set up the strong uniform magnetic field within the active medium monolithic frame 32; the magnetic field H must operate in the direction of the vector 55 along one confined and controlled region (pathway 44) of the optical pathway of the gyroscope in order to provide the optimum split gain effect. The magnets 52A through 52D (looking down the North Poles) are shown positioned in a diamond shaped configruation in FIGS. 3A and 3B. These dipoles may be arranged about the light path 44' of FIG. 3B in a substantially diamond shaped configuration. In yet another configuration, Magnet Support Channels 51, 53, 55, and 57 are machined or formed from the monolithic frame body 32 to cradle a set of magnets 52A through 52D about the light path 44' where the magnets 52A through 52D are configured in a substantially rectangular arrangement.

It should be noted that both semiconductor laser performance and the solid state media's gain improve at cryogenic temperatures down to that of liquid nitrogen. A relatively high magnetic field (parallel to the leg of the pathway (44) that is being pumped) is necessary to provide the Split Gain effect needed to suppress four unwanted modes of the eight modes available in the q and q+1 longitudinal modes over which the gyroscope operates. The frequency splitting needed is $c/(n*L)$, where n is the index of refraction, c is the speed of light in value, and L is the geometric pathlength.

During inertial rotation, the counterpropagating light or electromagnetic beams are relatively stable in the monolithic medium at the different beam frequencies. Under inertial operating conditions, the counterpropagating beams will be shifted oppositely in frequency, just as in the gas discharge ring laser gyroscopes. By use of circular polarization and application of magnetic fields as a bias, retroscatter-induced locking of the laser frequencies will not be a substantial factor in gyroscope performance. The residual effect, scatter-induced frequency pulling errors due to coupling between the beams by retroscatter, generally is quite small due to the following two factors:

1) The retroscatter at the reflection of the beams from the inside surfaces of the solid material frame may be controlled by proper polishing techniques to be quite small; and, 2) The time-averaged effect of this small retroscatter is also greatly diminished by the easily obtained large splitting of the mode frequencies by the Faraday effect and the non-planarity of the ray path.

The usual pitfall of the use of solid state laser materials for a ring laser gyroscope is that solid state laser materials are generally homogeneously broadened, permitting only one mode to oscillate at a time. The special split-gain-gyroscope-tuned splitting of the gain by the magnetic field would alleviate that problem by providing the $L_a$, $R_c$ mode pair with a separate gain curve from that of the $R_a$, $L_c$ mode pair. The large reciprocal splitting would significantly reduce competition between the $L_a$ and $R_c$ modes for the lower frequency gain. This split gain gyroscope magnetic gain detuning is a critical element for the successful operation of the invention of this disclosure.

Additionally, the solid state multioscillator ring laser gyroscope (shown in FIGS. 3A and 3B) will provide cost savings over the gaseous medium ring laser gyroscope because the "mirror" facets can be chosen so that two of the four reflecting surfaces, 34 and 36, will have total internal reflection (TIR) and therefore require no coating; while the semi-transparent output surface 38 and the input surface 39 require simple coatings. Also, the use of crystalline materials for the gain medium or laser body has the advantage that thermal conductivity of crystals is usually much larger than that of glasses and therefore allows for the reducing of thermal gradients. The monolithic solid state crystal ring laser gyroscope of this invention, unlike the gaseous medium gyroscope, does not need to be contacted to any metallic objects, like cathodes, anodes, or fill stems. The absence of metallic components means that the solid state gyroscope exhibits reduced distortions due to differential expansion coefficients. By reducing distortions, one is able to maintain greater gyroscope accuracy.

Figure 4:
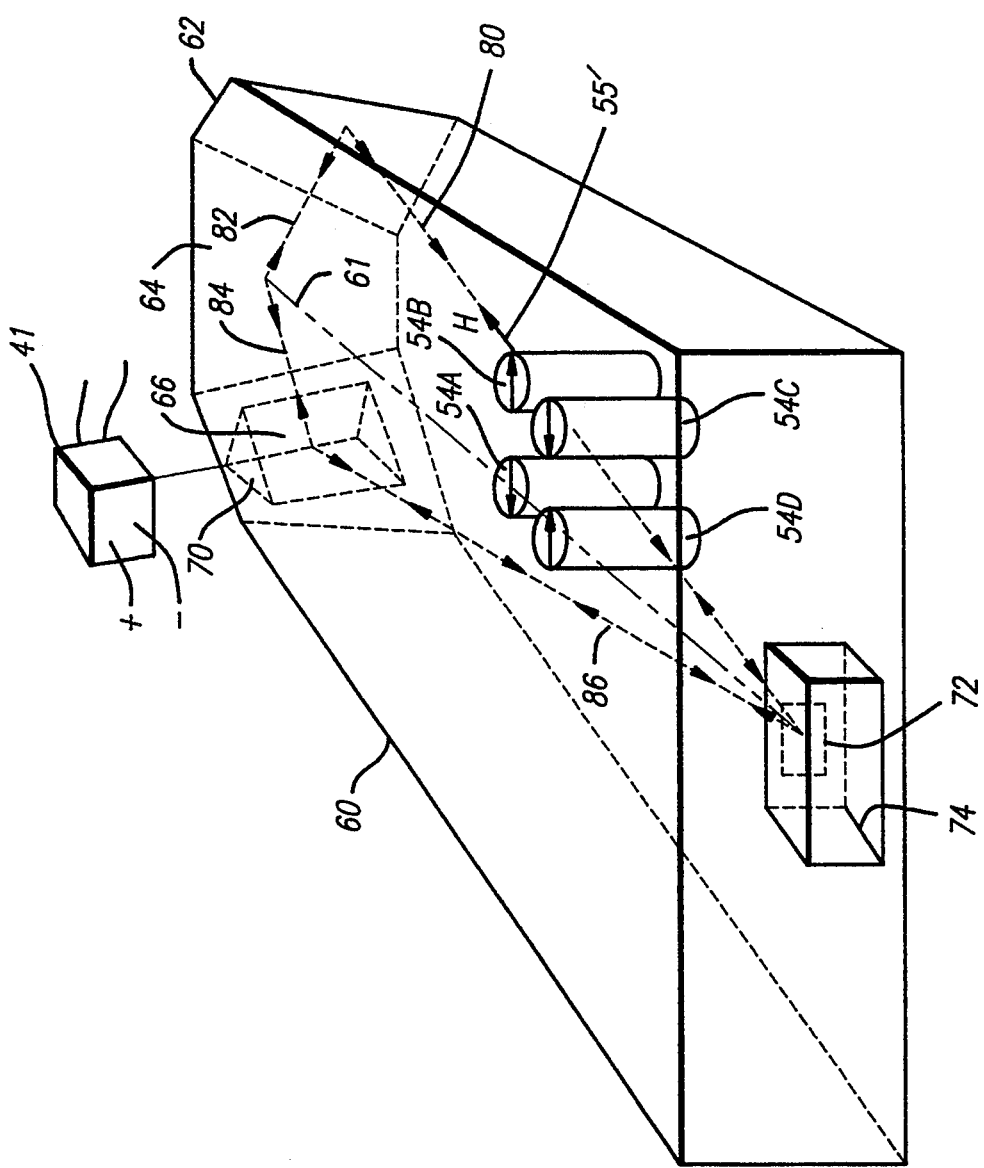
FIG. 4 is a perspective view of an alternative embodiment of the Solid State Multioscillator Ring Laser Gyroscope which is the subject of this application using a set of magnets 54A through 54D.

FIG. 4 shows an alternative embodiment of the solid state split gain ring laser gyroscope configuration. Alternative magnet configurations are shown in FIG. 4, including magnetic sources 54A-54F for optimizing the split gain effect. The magnets 54A through 54F are not conventional dipoles, but rather are longitudinally extended magnets having the North and South magnetic poles diametrically opposite one another along the entire axial length of the pole. In this manner, the magnets 54A through 54D may be dropped into annular slots in the frame 60, as shown in FIG. 4, producing a magnetic field H, directed along vector 55', that is substantially along the light pathway 80 and transverse to the magnet bodies. One set of field lines extends, in the example shown in FIG. 4, from magnet 54C to 54B, while another set of substantially parallel field lines extend from magnet 54D to 54A.

Figure 2:
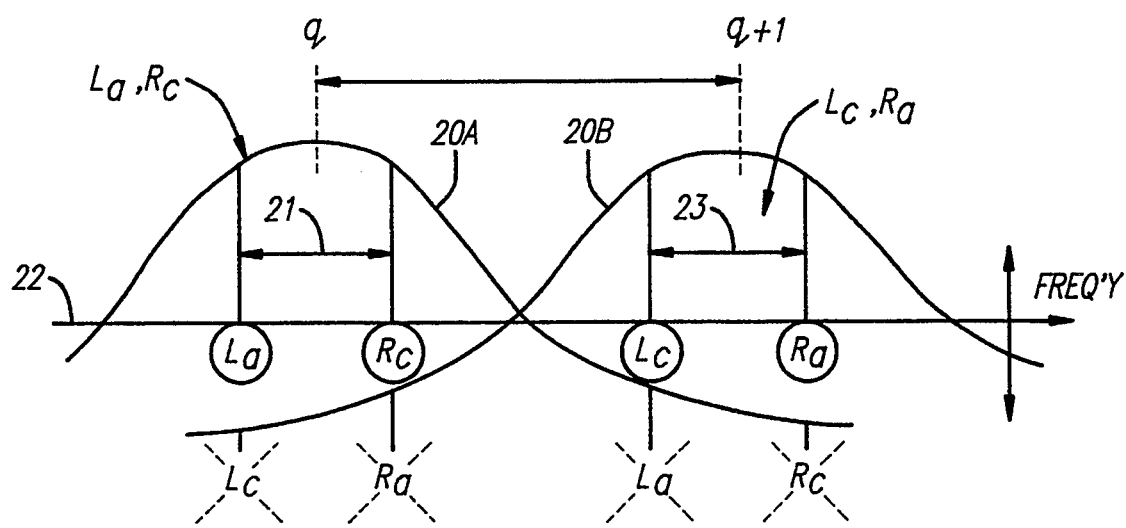
FIG. 2 is a PRIOR ART graphic representation of the Gain Profile curve for a non-planar Split-Gain multioscillator ring laser gyroscope, showing both the "q" and "q+1" longitudinal modes of the Split Gain Gyroscope, illustrating the process of mode suppression characteristic of a Split Gain Gyroscope.
Figure 5:
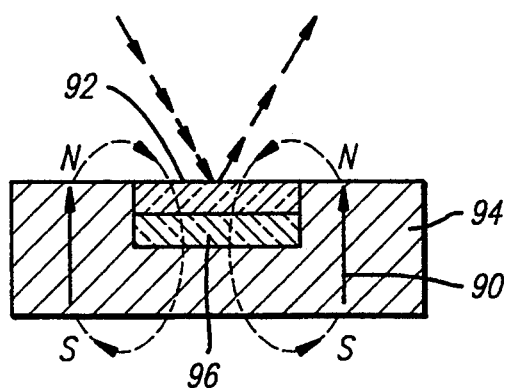
FIG. 5 is an enlarged view of the forward section of the Solid State Multioscillator Ring Laser Gyroscope which is the subject of this application, showing a substantially reduced size solid state active medium 92 region influenced by a controlled and uniform magnetic field to provide the split gain effect.

Unlike the design disclosed in FIGS. 3A through 3C, this alternative embodiment of the gyroscope shown in FIG. 5 is directed to a design that has an active medium 92 bonded to a magnetized substrate 94 (showing the direction of the magnetic fields from N to S poles). A semi-conductor laser diode source 96 (possibly made from Ga As) is embedded in the substrate 94 below the active medium 92. The solid state active medium 92 of this alternative embodiment occupies a relatively small portion of the overall resonator pathway and, by analogy to FIG. 4, is positioned where the laser source 72 is in FIG. 4. The active medium 92 represents a portion of the non-planar resonant pathway which is much less that 5% of the total circumference of a resonator pathway, such as light path 80, 82, 84, and 86 of FIG. 4. Such a design is feasible, and provides a low cost alternative to the designs of FIGS. 3A through 3C and 4. The proper angle is a function of the indices of refraction of the gain medium and the higher index media surrounding the gain. The gain is increased by at least four orders of magnitude relative to that in a waveguide of the same length. Thus, one can expect that the gain in regions of dimensions about $0.04 \text{ cm} \times 0.4 \text{ cm} \times 10 \text{ }\mu m$ will be high enough to obtain oscillation in material such as Nd:Glass and Er:Glass. Such a size would be substantially smaller than the dimensions of the frame 60 and could easily fit on an integrated Optics Chip. An active medium material 72 (like Nd doped $SiO_2$ or glass), about 0.1 mm thick could be used and embedded at the surface of a $TiO_2$ substrate 74. The index of refraction of the $TiO_2$ is approximately 2.6, while the Nd:Glass may be a 1.48 index. In the presence of an orthogonally directed magnetic field (H), the active medium (92 of FIG. 5), allows for the necessary split gain effect to be achieved; thus, a split gain ring laser gyroscope is provided that has an active medium on an optical chip. A permanent magnetic source, such as magnetized substrate 94, may provide a relatively uniform and high density magnetic field across the gain medium 92, but with a substantially smaller magnet volume than is required to provide the necessary mode suppression by the magnetic sources (52A through 52D or 54A through 54F of FIGS. 3A through 3C, and 4, respectively) over the entire gain medium of the frames 32 or 60. Since the gain medium 92 of FIG. 5 is substantially smaller in size and volume than the crystal requirements of FIGS. 3A and 4, a smaller magnet may be used to achieve a comparable split gain effect across the resonant longitudinal modes established with the gain medium 92. The gain medium 92 can lase at a relatively low power in the FIG. 5 design, as it is optically pumped by the laser diode 96, when compared with the embodiment of FIGS. 3A-3C and 4. As one can see from viewing the gain curve of FIG. 2, the splitting and separation between frequency modes in the split gain is much larger than the Faraday splitting between modes of the multioscillator gyroscope of FIG. 1. Yet, the design shown in FIG. 5 illustrates that where a gain medium size can be substantially decreased, the split gain effect may still be achieved within the Gyroscope, due in large part to the fact that the interface between the active medium 92 and the substrate 94, upon which the medium is positioned, may be engineered for maximum gain.

Figure 6A:
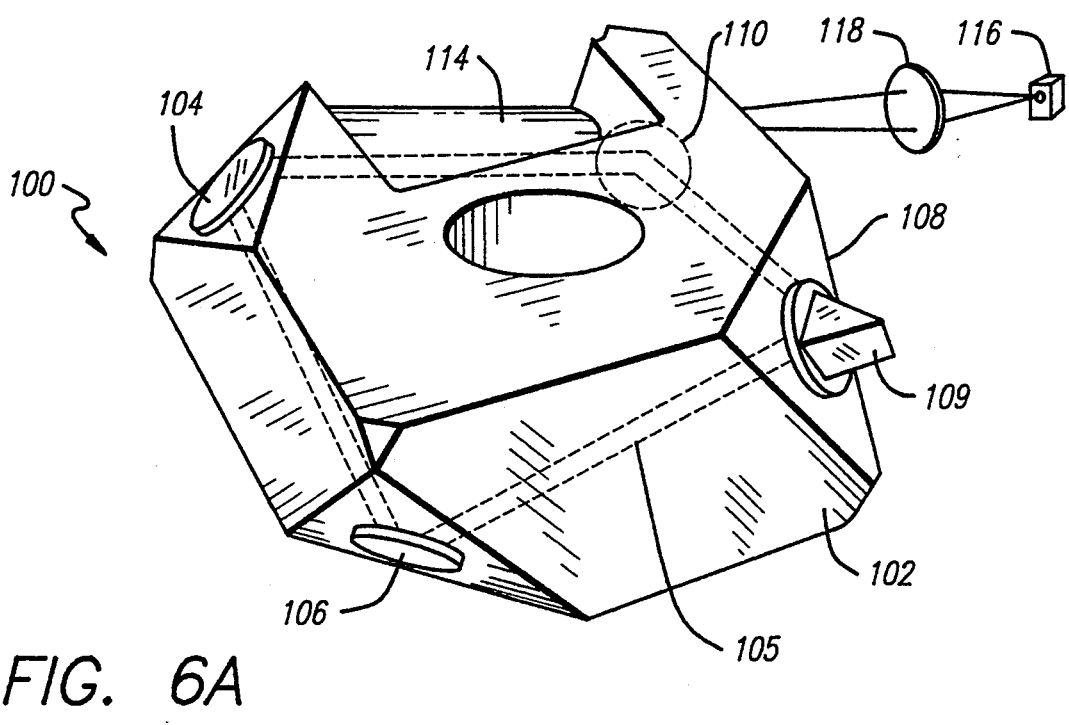
FIG. 6A shows a perspective view of yet another alternative embodiment of the Solid State Multioscilltor Ring Laser Gyroscope which is the subject of this invention.
Figure 6B:
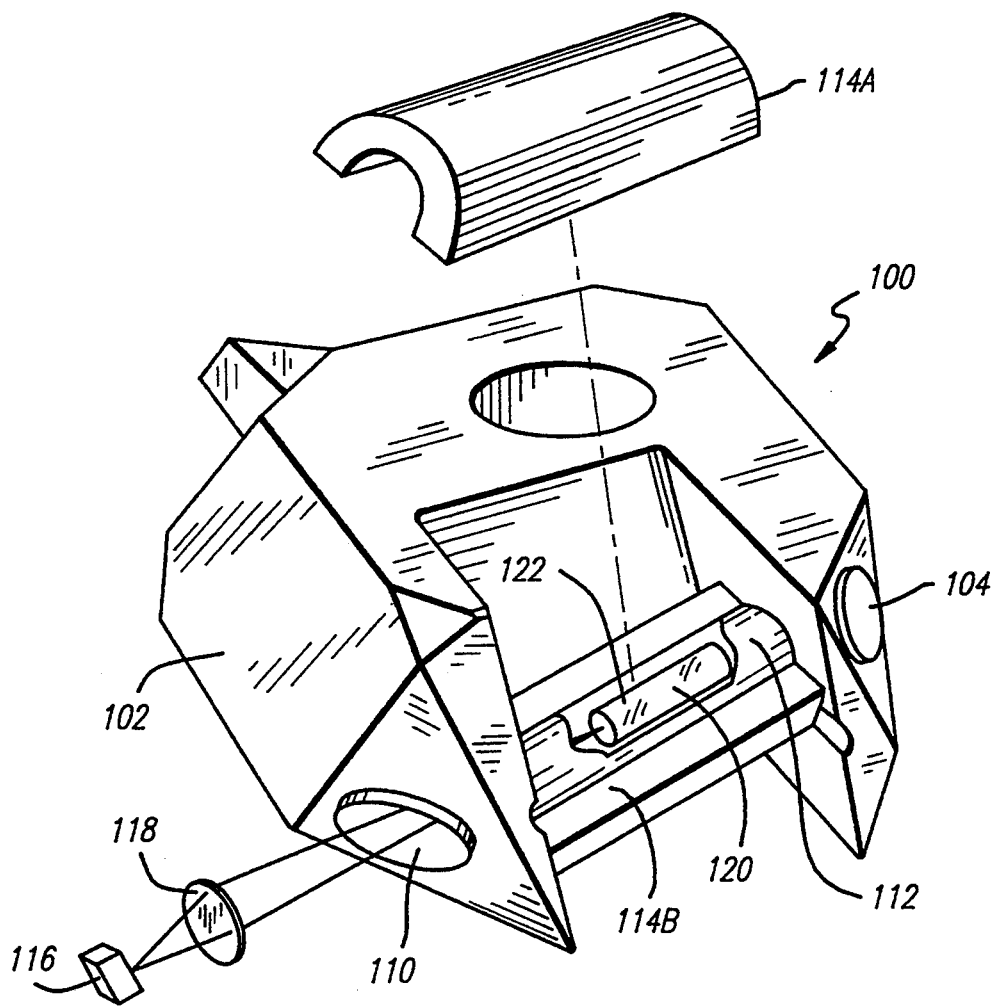
FIG. 6B shows an alternative perspective view of the embodiment of this invention shown in FIG. 6A wherein the cut-away leg of the gyroscope is shown in an exploded view to illustrate the position of the solid state active medium with respect to the magnetic source.

An alternative embodiment of the invention is disclosed in FIGS. 6A and 6B. With reference to these Figures, a solid state ring laser gyroscope 100 is generally shown having a monolithic frame 102. The frame is cut away exposing a leg 112. At each of the corners of the frame 102 are corner mirrors 104, 106, 108, and 110. An output optics prism 109 is positioned on semi-transparent mirror 108 for detecting the output light from the laser cavity. The mirrors are aligned to define a non-planar pathway 105. A Laser source 116 uses a lens 118 to focus an input excitation beam on the active medium Nd:YAG crystal 120. The active medium crystal 120 is excited by the input beam from the lens 118 and a strong magnetic field 122 (H), provided by axially poled magnets 114A and 114B, is applied axially to the active medium in order to achieve the split gain effect. In this manner, an alternate embodiment of a monolithic frame ring laser gyroscope is presented which can be the same size and is suitable for sensing rotation in a configuration not unlike the gaseous medium split gain multioscillator ring laser gyroscope, but without the need for cathodes and anodes requiring high voltage to stimulate the amplification of light to a lasing stage. The laser action arises in the solid state crystal medium 120, thereby providing a gyroscope which is far less complex and not subjected to the temperature changes due to the presence of a gas plasma common in the gaseous medium multioscillator of the prior art.

As explained above, the split gain gyro concept requires that the gain curves be split magnetically by the an amount equal to the free spectral range, i.e. $c/(n*L)$ where c is the speed of light in a vacuum, n is the index of refraction of the solid material, and L is the laser path length or perimeter length of the resonant ring. It is therefore useful to determine how the flux density of the magnetic field is influenced or limited by the body size of a subject invention gyroscope.

As observed and explained in the Russian to English translation of an article by O. E. Nanii and A. N. Shelaev, Sov. J. Quantum Electron. 14, (5), May 1984 published in 1984 by the American Institute of Physics, at pages 638–642, and more particularly at page 639, column 1, lines 1-12, in Nd;YAG, the 1064 nm line is magnetically split at a rate of substantially 7.8 Mhz/Oe. The index of refraction for the Nd;YAG material, n is 1.82. Using these parameters, it is possible to compute an approximate value of $L=21$ cm for a magnetic field intensity of 100 Oe. An invention gyro with a path length of 21 cm. would typically have a path length for each side of approximately two inches. Nd;YAG Crystals of sufficiently high optical quality are limited in their practical growth size to a maximum diameter of about a 3 inches which provides a practical upper limit for the size of a solid state split-gain multioscillator ring laser gyro that might be made. It is estimated that a gyro with a path length of 21 cm could be made from a crystal having a diameter of approximately three inches.

From the expression $g*H=c/(n*L)$, it can be seen that as the size of the invention gyro increases with L, the required field intensity decreases. Therefore, by establishing a practical upper boundary for L, due to limitations on the size of available ingots, it is possible to establish a lower boundary for the field intensity at 100 Oe where it is understood that 100 Oe=100 Gauss. The useful range for magnetic field strength or magnetic field density is therefore believed to extend from 100 Gauss to 1 Tessla for permanent magnetic sources and from 1 T to 10 T as discussed above using high temperature superconductor materials.

While preferred embodiments are shown, it is clear that alternative equivalent embodiments of the invention may be envisioned which provide adequate alternatives, performing similar functions to the preferred embodiment, yet using the basic teachings and principles of the herein described invention. For example, the cost of Nd:YAG is high, especially for the embodiment shown in FIGS. 3A and 4; thus, the crystal might be alternatively made from Nd:Glass. Such material would require a much higher pump density than Nd:YAG material, since Nd:Glass has a lower and broader gain profile. This results in a need to greatly reduce the beam cross-section in the solid state gyroscope so that all the pump energy is within the beam mode volume. Thus, alternate embodiments having substantially equivalent functions or structures are intended to be comprehended within the scope of the appended claims.

What is claimed is:

1. A multioscillator ring laser gyroscope, powered from a power source, comprising:
    a solid-state active medium ring resonator, including a non-planar resonant bi-directional pathway, suitable for supporting clockwise and anti-clockwise longitudinal modes;
    laser means for driving said active medium above a threshold for oscillation, said laser means operatively associated with said ring resonator; and,
    magnetic means for achieving a magnetic gain detuning effect within said resonator, said magnetic means being external to said resonant pathway;
    output means for combining the clockwise and anti-clockwise longitudinal modes and for providing an output signal;
    whereby, a solid state split gain multi-oscillator is achieved.

2. The multioscillator ring laser gyroscope of claim 1, wherein:
    said laser means is a continuous wave semi-conductor laser diode operating at a preset frequency.

3. The multioscillator ring laser gyroscope of claim 2, wherein:
    the preset frequency is set to a preset wavelength about 0.82 microns wavelength.

4. The multioscillator ring laser gyroscope of claim 1, wherein:
    said solid-state active medium ring resonator is a laser diode pumped, monolithic, solid-state active medium, preferably made from a Neodymium-Yttrium Aluminum Garnet (Nd:YAG) material, distinguished, in part, by the presence of a plurality of uncoated total internal reflecting (TIR) surfaces defining said non-planar resonant pathway.

5. The multioscillator ring laser gyroscope of claim 1, wherein:
    said magnetic means being manufactured from Samarium Cobalt, for producing a higher magnetic field, in the range of 1 Tesla magnetic field strength.

6. The multioscillator ring laser gyroscope of claim 1, wherein:

said magnetic means being manufactured from a high temperature superconductor material such as Yttrium Barium Copper Oxide for producing a high magnetic field, in the range of 1–10 Tesla magnetic field strength.

7. The multioscillator ring laser gyroscope of claim 1, wherein:
the solid state active medium is present over a relatively small portion of said resonator, said portion being less than 5% of the non-planar resonant pathway.

8. A multioscillator ring laser gyroscope; powered from a power source, comprising:
an externally pumped solid-state active medium ring resonator, including a non-planar resonant bi-directional pathway, suitable for supporting counterpropagating clockwise and anti-clockwise circularly polarized longitudinal modes;
said non-planar resonant bi-directional pathway being non-planar by a substantially sharp angle greater than 45° ; and,
magnetic means for achieving a split gain magnetic detuning of said counterpropagating modes within said resonator, said magnetic means being external to said resonant pathway;
output means for combining the counterpropagating clockwise and anti-clockwise circularly polarized longitudinal modes and for providing an output signal;
whereby, a solid state split gain multi-oscillator is achieved.

9. The multioscillator ring laser gyroscope of claim 8, further including:
laser means for driving said active medium above a threshold for oscillation, said laser means operatively associated with said ring resonator.

10. The multioscillator ring laser gyroscope of claim 9, wherein:
said laser means is a continuous wave semi-conductor laser diode operating at a preset frequency, said laser means optically pumping said active medium to sustain a plurality of said circularly polarized longitudinal modes in said bi-directional pathway of said ring resonator.

11. The multioscillator ring laser gyroscope of claim 8, wherein:
the solid state active medium region is present over a relatively small portion of said resonator, said portion being less than 5% of the non-planar resonant pathway.

12. The multioscillator ring laser gyroscope of claim 8, wherein:
said magnetic means being manufactured from Samarium Cobalt, for producing a higher magnetic field, in the range of 1 Tesla magnetic field strength.

13. The multioscillator ring laser gyroscope of claim 8, wherein:
said magnetic means being manufactured from a high temperature superconductor material such as Yttrium Barium Copper Oxide for producing a high magnetic field, in the range of 1–10 Tesla magnetic field strength.

14. The multioscillator ring laser gyroscope of claim 8, wherein:
said magnetic means is operating for producing a magnetic field strength in the range of 100 Gauss up to 1 Tesla magnetic field strength.

15. A multi-oscillator split gain ring laser gyroscope, powered from a power source, comprising, in combination:
a monolithic frame having at least four corner mirrors defining a closed optical pathway, said pathway being suitable for supporting counterpropagating clockwise and anti-clockwise circularly polarized longitudinal modes;
said monolithic frame including a hollow resonant cavity defined between adjoining mirrors in a polygonal configuration;
a solid-state active medium crystal positioned along a portion of said hollow resonant cavity along said closed optical pathway between at least two of said at least four mirrors;
means for externally optically pumping said solid-state active medium crystal;
magnetic means for achieving a split gain magnetic detuning of said counterpropagating modes within said optical pathway, said magnetic means being external to said resonant pathway; and,
output means for combining the counterpropagating clockwise and anti-clockwise circularly polarized longitudinal modes and for providing an output signal.

16. The multi-oscillator split gain ring laser gyroscope of claim 15, wherein:
means for externally optically pumping said solid-state active medium includes a semi-conductor laser source and a means for focusing the output beam from said source onto said active medium crystal.

17. The multi-oscillator split gain ring laser gyroscope of claim 15, wherein:
said magnetic means includes a hollow sleeve permanent magnet which is adapted to surround an exposed leg of said frame, said frame leg housing said active medium crystal, whereby a split gain magnetic detuning of said counterpropagating modes within said optical pathway is achieved.

18. The multioscillator ring laser gyroscope of claim 15, wherein:
said magnetic means is operating for producing a magnetic field strength in the range of 100 Gauss up to 1 Tesla magnetic field strength.

19. The multioscillator ring laser gyroscope of claim 17, wherein:
said magnetic means is operating for producing a magnetic field strength in the range of 100 Gauss up to 1 Tesla magnetic field strength.

* * * * *